April 5, 1949.  E. HANSON  2,466,025

PACKING LUBRICATING SYSTEM

Filed Feb. 17, 1945  3 Sheets-Sheet 1

INVENTOR.
EDWARD HANSON.
Geo. B. Pitts
BY
ATTORNEY.

April 5, 1949.　　　　　E. HANSON　　　　　2,466,025
PACKING LUBRICATING SYSTEM
Filed Feb. 17, 1945　　　　　　　　　　　3 Sheets-Sheet 2

INVENTOR.
EDWARD HANSON.
BY Geo. B. Pitts
attorney

INVENTOR.
EDWARD HANSON.
BY Geo. B. Pitts
attorney

Patented Apr. 5, 1949

2,466,025

UNITED STATES PATENT OFFICE 2,466,025

PACKING LUBRICATING SYSTEM

Edward Hanson, Cleveland, Ohio, assignor of one-tenth to George B. Pitts, Cleveland Heights, Ohio Application February 17, 1945, Serial No. 578,387

16 Claims. (Cl. 286—19)

This invention relates to a lubricating system for a shaft which extends through a packing or stuffing box, the lubricant being supplied under pressure to the packing and the latter having an outlet for the discharge of the lubricant escaping through the packing material, whereby the escaping lubricant may be collected and re-supplied to the packing manually or automatically. The invention is particularly useful in connection with an encased mechanism of a type which sets up a pressure within the casing, whereby such pressure may be utilized to supply the lubricant to the packing, as well as equalize the pressure therein, as herein set forth.

One object of the invention is to provide an improved lubricating means for a shaft which extends through a packing, wherein the lubricant is supplied under pressure.

Another object of the invention is to provide an improved lubricating means for a shaft which extends through a packing, wherein the lubricant is supplied under pressure, and means are employed to equalize the pressure on the inner end of the packing to prevent leakage of the lubricant inwardly along the shaft.

Another object of the invention is to provide in connection with an encased mechanism the operation of which creates a pressure within its casing, improved lubricating means for the shaft which is mounted in a packing and drives or is driven by said mechanism and wherein the pressure created in said casing is utilized to supply lubricant to the shaft.

Another object of the invention is to provide in connection with an encased mechanism the operation of which creates a pressure within its casing, improved lubricating means for the shaft which is mounted in a packing and drives or is driven by said mechanism and wherein the pressure created in said casing is utilized to supply lubricant to the shaft, to equalize the pressure within the packing inwardly of the supplied lubricant, whereby leakage of the lubricant into the casing is prevented and to prevent intake of air into the casing.

Another object of the invention is to provide an improved packing or stuffing box having an inlet and an outlet and lubricating means for the shaft which extends therethrough, wherein the lubricant is supplied under pressure to the inlet of the packing and the latter is arranged to permit escape of the lubricant to the outlet, whereby heating due to rotation of the shaft is eliminated and wear on the material of the packing is materially reduced.

Another object of the invention is to provide an improved lubricating system for a shaft which extends through a packing or stuffing box, wherein lubricant is supplied from a chamber under pressure and the lubricant escaping through the material of the packing or stuffing box is automatically returned to a reservoir for re-supply to the chamber.

Other objects of the invention will be apparent to those skilled in the art to which my invention relates from the following description taken in connection with the accompanying drawings, wherein Fig. 1 is a fragmentary section of a lubricating system for a packing embodying my invention.

Figure 3:
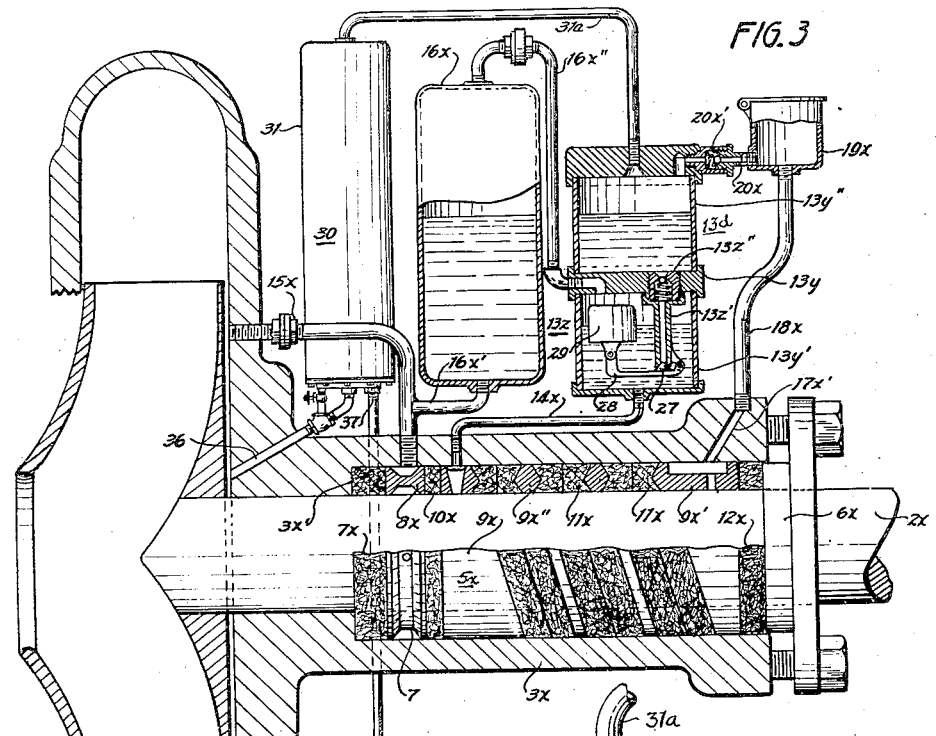
Fig. 3 is a fragmentary section showing a different embodiment of the invention.

In the drawings, 1 indicates as an entirety a closed casing (a portion only of which is shown), for a mechanism connected to a shaft 2, preferably employed to drive the mechanism. The casing 1 is provided with a hollow boss 3 through which the shaft 2 extends. The inner portion of the opening through the boss 3 fits the shaft 2, whereas the outer portion (which portion is preferably somewhat longer than the inner portion) is enlarged to form a pocket 4 for a packing indicated as an entirety at 5 around the shaft 2 and an end wall 4a forming a seat for the inner end of the packing 5 which is held in position under pressure by a device 6. The packing serves to prevent the escape of the material (liquid and/or gas) within the casing 1. The device 6 preferably consists of an annular wall 6a engaging the outer end of the packing 5 and provided with a flange 6b, which is connected to the boss 3 by diametrically related cap screws 6c threaded into the end wall thereof. The mechanism within the casing 1 is of a type the operation of which establishes a pressure therein. As such mechanism may be of various forms, illustration thereof is omitted; however, one example is shown in Fig. 3 as consisting of a rotary pump A.

Figure 1:
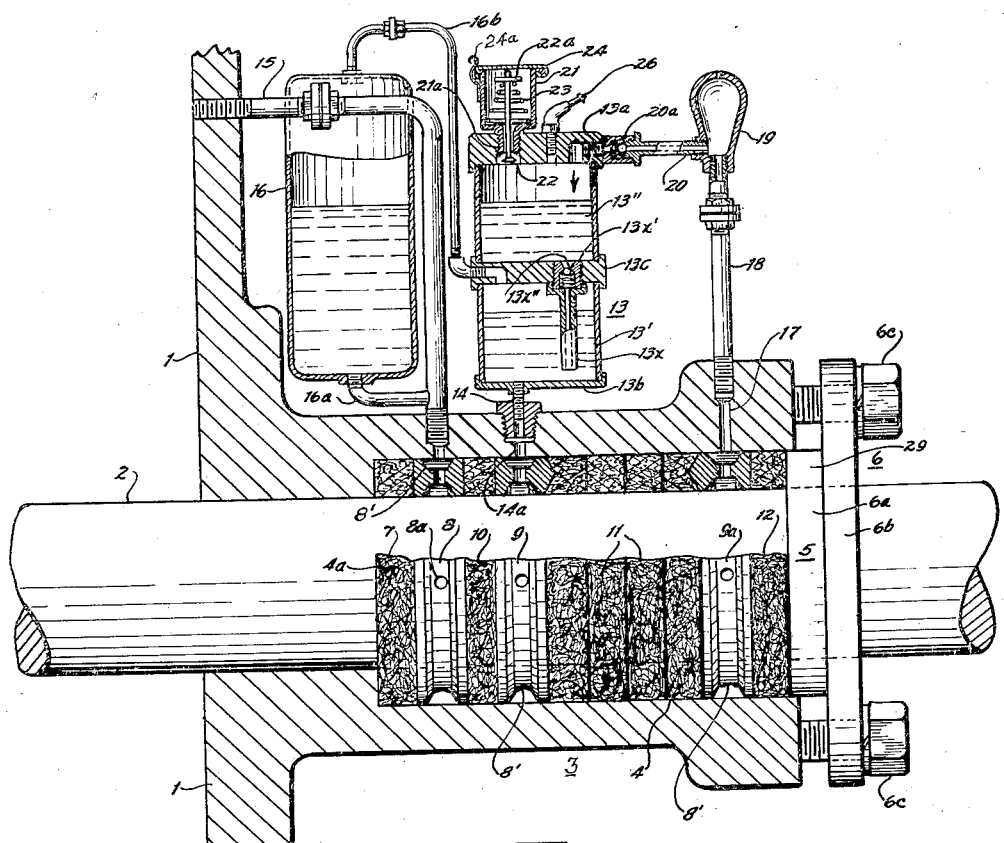
Figure 5:
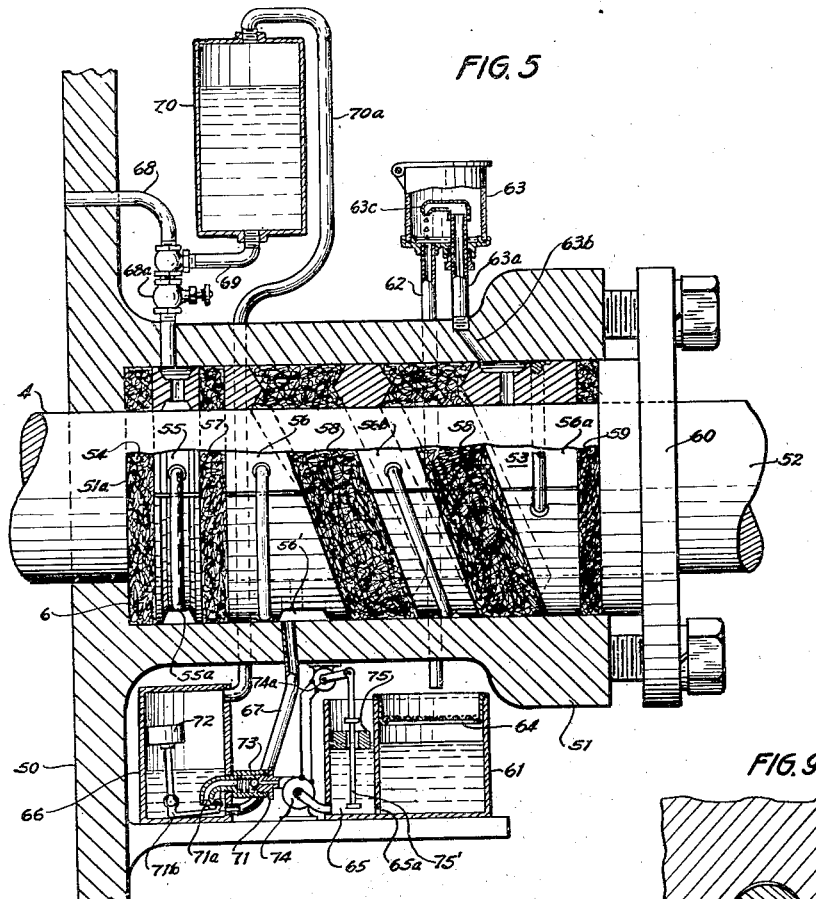
Fig. 5 is a fragmentary section showing another embodiment of the invention.
Figure 9:
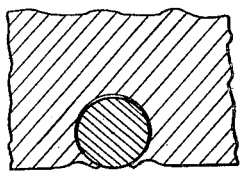
Fig. 9 is a section on the line 9—9 of Fig. 6, enlarged.
Figure 6:
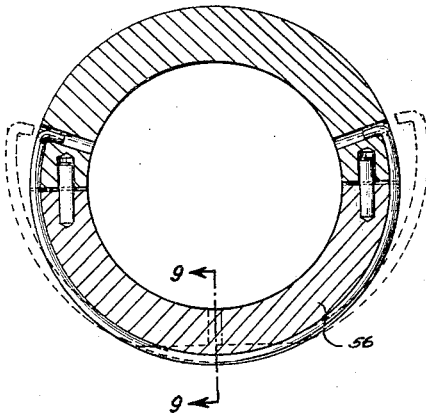
Fig. 6 is a section on the line 6—6 of Fig. 7.
Figures 7, 8:
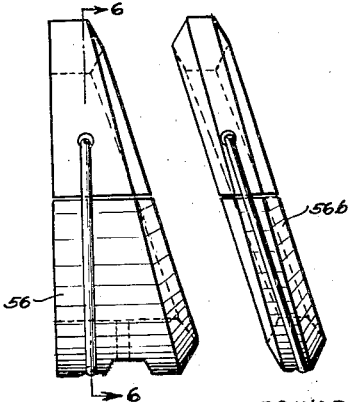
Figs. 7 and 8 are side elevations of parts of the packing shown in Fig. 5.

The packing 5 consists of a section of packing material 7 seated against the end wall 4a, a lantern ring 8 engaging the packing material 7, inner and outer pressure rings 9, 9a, a section of packing material 10 between the lantern ring 8 and the inner pressure ring 9, sections of packing material 11 between the rings 9 and 9a and a section of packing material 12 between the outer pressure ring 9a and the device 6. As shown in Figs. 1, 3 and 5, the pressure rings and packing materials related thereto may be varied in their construction.

In the form of construction shown in Fig. 1, the opposite faces of each of the rings 8, 9 and 9a are parallel and the side of each ring is formed with an annular recess 8' and at spaced points around its circumference it is formed with openings 8a for a purpose later set forth.

13 indicates a tank for a suitable lubricant. The tank 13 is provided intermediate its upper and lower end walls 13a, 13b, with a transverse division wall 13c forming a lower chamber 13' for a supply of the lubricant and an upper chamber 13" forming a reservoir for the lubricant. The bottom wall 13b of the chamber 13' is provided with a discharge pipe 14 connected with a through opening 14a formed in the wall of the boss 3 for supplying the lubricant to the recess 8' of the ring 9, from which recess the lubricant is supplied to the shaft 2 through the adjacent openings 8a. The lubricant in the chamber 13" is supplied to the chamber 13' through a pipe 13x which is connected to a fitting 13x' mounted in the division wall 13c, the fitting 13x' being provided with a normally closed spring operated valve 13x" adapted to be opened due to pressure created in the chamber 13" above the level of the lubricant therein as later set forth. As the lubricant in the chamber 13' is under pressure, as later set forth, and the lubricant in the chamber 13" is normally under atmospheric pressure, the check valve 13x" prevents escape of the lubricant or air from the chamber 13' to the chamber 13".

15 indicates a pipe connected at its outer end with the casing 1. The inner end of the pipe is connected with an opening formed in the wall of the boss 3, which opening is in turn connected to the recess 8' formed in the ring 8. The liquid operated upon in the casing 1, due to the pressure created therein, is forced through the pipe 15 to the ring 8 for a purpose later set forth and to form in conjunction with the packing material 7 a seal to prevent intake of air resulting from any suction effect around the shaft 2 adjacent the side wall of the casing 1. 16 indicates a tank in which air is compressed in the manner later set forth. The pipe 15 is connected to the lower end of the tank by a pipe 16a. The upper end of the tank 16 is connected by a pipe 16b to the chamber 13' above the level of the lubricant therein, the outlet end of the pipe 16b being preferably connected to a duct formed in the wall 13c.

In operation, a portion of the liquid operated upon in the casing 1 is forced through the pipe 15 to the ring 8 and also through the pipe 16a into the tank 16, the liquid discharged into the tank 16 serving to compress the air therein and set up a pressure on the lubricant in the chamber 13', the effect of which is to force the lubricant from the latter to the pressure ring 9. It will thus be observed that this supply of the lubricant under pressure tends to force the lubricant both outwardly and inwardly of the shaft 2, but as the ring 9 is supplied with liquid under pressure from the pipe 15, the pressure exerted by the lubricant inwardly of the shaft 2 is equalized or counteracted, to prevent leakage or escape of the lubricant into the casing 1.

By preference the device 6 is so adjusted against the outer end of the packing 5 that undue compression of the sections of packing material 11 is avoided, whereby heating and wear on the shaft 2 is materially reduced and the lubricant may readily flow from the pressure ring 9 to the pressure ring 9a, and then flow back to the chamber 13", as hereinafter set forth. The adjustment of the device 6 is so related to the pressure of the supplied lubricant that flow thereof to the ring 9a is not materially retarded. To provide for the return of the lubricant from the pressure ring 9a, the annular recess 8' therein is connected through a duct 17 formed in the wall of the boss 3 to a pipe 18 in which the lubricant rises into a collector 19 on the upper end thereof. The lower end of the collector 19 is connected by a pipe 20 with the chamber 13". The pipe 20 is provided with a check valve 20a to prevent flow of air in the chamber 13" or lubricant therein through the pipe 20 to the collector 19. The collector 19 is vented to permit escape of air therein due to rise of the lubricant in the pipe 18 and collector as well as to permit the lubricant to freely flow from the collector into the chamber 13". The spring for the valve 20a is of a form to exert slight pressure on the valve element so that flow of the lubricant from the collector 19 is not retarded.

The top wall of the chamber 13" supports a suitable oil cup 21. The bottom wall of the cup 21 is provided with a depending nipple 21a which is externally threaded so as to engage a threaded opening formed in the top wall of the chamber 13". The discharge end of the nipple 21a forms a seat for a valve 22. The shank of the valve extends upwardly into the cup 21 and carries a collar 22a, so that a spring 23 interposed between the collar and the bottom of the oil cup normally operates to maintain the valve closed. By preference the oil cup 21 is provided with a hinged cover 24 and the shank for the valve 22 is of a length to be engaged and operated endwise by the cover when the latter is closed, against the tension of the spring 23. Accordingly, when the cover 24 is raised and the cup 21 is being filled, the valve 22 is closed, but upon closing of the cover 24, the valve 22 will be opened to permit flow of the lubricant from the cup 21 into the chamber 13". The cover 24 is secured in closed position by a resilient strip 24a forming a snap connection therewith, adapted to release the cover when the cup 21 is to be filled with the lubricant.

26 indicates a fitting mounted in the top wall of the chamber 13" and having a normally closed valve. The fitting is adapted to be connected with a hose or pipe through which air under pressure is supplied from a suitable source. When the chamber 13' needs to be charged with additional lubricant, the cover 24 is raised to permit the valve 22 to close and an air hose is connected to the fitting 26, the supplied air serving to provide pressure on the lubricant in the chamber 13" and force it past the check valve 13x" into the chamber 13'.

It will be observed that when the mechanism in the casing 1 is started running, the pressure created therein will force some of the liquid (such as water) in the casing through the pipe 15 into the lantern ring 8 and into the tank 16 with the result that the air therein and in the pipe 16b and chamber 13' will be compressed to effect pressure on the lubricant in the chamber. This operation will continue until the pressure of the air in the system equals or balances the pressure of the liquid supplied by the mechanism in the casing 1, through the pipe 15 to the ring 8 so that supply of liquid to the tank 16 and ring 8 stops. However, as the lubricant in the chamber 13' is forced therefrom and the pressure of the air therein is reduced, the unbalanced pressure relation resulting therefrom will permit the pressure in the casing 1 to immediately supply liquid therefrom to the pipe 15 and tank 16 to restablish a balanced relation between the compressed air and liquid pressure in the ring 8. Accordingly, it will be seen that the pressure of the lubricant supplied to the ring 9 and the pressure of the liquid supplied to the ring 8 are continuously maintained in a substantially equalized or balanced relation and that such pressures are dependent simultaneously upon the pressure created or maintained in the casing 1.

Figure 2:
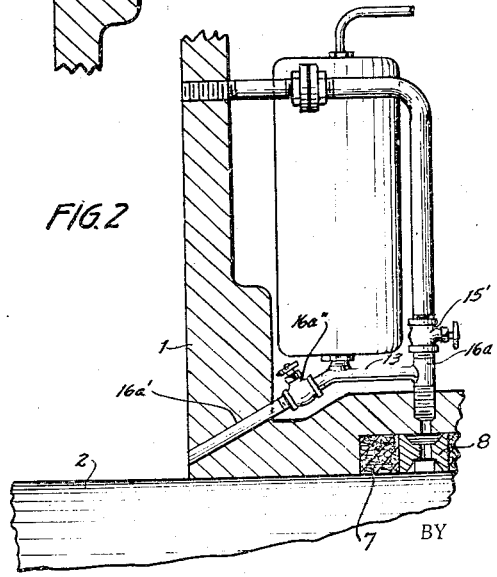
Fig. 2 is a fragmentary section showing a slight modification of the construction shown in Fig. 1.

Fig. 2 illustrates a modified form of construction wherein the pipe 16a, which connects the liquid supply pipe to the pressure tank 16, is provided with a branch pipe 16a' connected to the casing 1, so that liquid in the tank 16 and pipe 15 may be drained into the casing 1 and the latter emptied through a suitable discharge opening usually provided in constructions of the type disclosed. The branch pipe is provided with a suitable valve or cut-off 16a''. By preference the pipe 15 is provided with a cut-off 15'.

Figure 4:
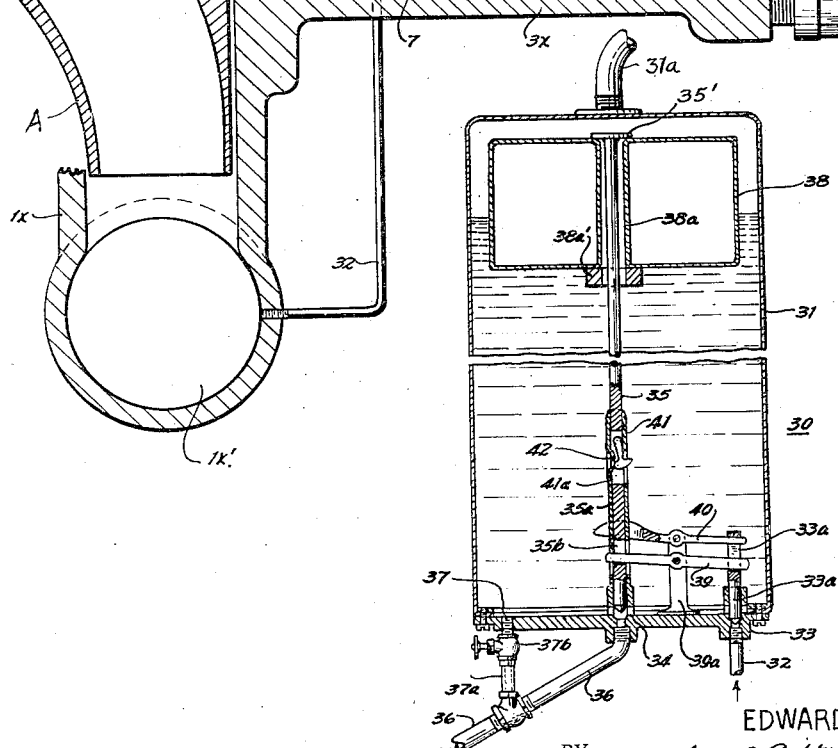
Fig. 4 is a fragmentary section of parts shown in Fig. 3.

Figs. 3 and 4 illustrate a modified form of construction wherein the lubricant is automatically supplied from the reservoir to the supply chamber, when the supply in the latter is reduced. Referring to Fig. 3, 1x indicates a casing enclosing the impeller A and having an outlet 1x'. 3x is a boss through which the shaft 2x extends for connection to the impeller. 5x indicates as an entirety a packing within the boss 3x. The packing 5x consists of a section of packing material 7x seated against the inner end wall 3x' of the boss, a lantern ring 8x (which is similar in construction to the ring 8), an inner pressure ring 9x, an outer pressure ring 9x', intermediate pressure rings 9x'', a section of packing material 10x between the lantern ring 8x and the inner pressure ring 9x, sections of packing material 11x spaced by the intermediate pressure rings 9x' between the pressure rings 9x, 9x', and a section of packing material 12x between the outer pressure ring 9x'' and the clamping device 6x, which is adjustably connected to the outer end wall of the boss similar to the device 6 shown in Fig. 1, the device 6x serving to hold the parts of the packing together. The construction of the pressure rings and packing therebetween form the subject-matter of Letters Patent No. 2,366,729 granted to me on January 9, 1945. 13d indicates a tank having a transverse division wall 13y forming therebelow a lubricant supply chamber 13y' and thereabove a reservoir 13y'' for the lubricant. The chamber 13y' is connected by a pipe 14x to the inner pressure ring 9x, whereby the lubricant is supplied or fed under pressure to the packing 5x as already set forth in connection with the disclosure in Fig. 1. The lubricant flows through the packing 5x to the outer pressure ring 9x' and then through a duct 17x' to a pipe 18x in which the lubricant rises into a collector 19x. The collector 19x is connected by a pipe 20x with the reservoir 13y'', whereby the lubricant may be re-supplied to the system. The pipe 20x is provided with a check valve 20x' to seal the reservoir against the pressure maintained therein, as later set forth. The lubricant in the reservoir 13y'' is supplied to the chamber 13y' through a pipe 13z' which is connected to a fitting 13z'' mounted in the division wall 13y, the fitting 13z'' being provided with a normally closed spring operated check valve. The lower end of the pipe 13z' forms the seat for a valve 27 mounted on a pivoted arm 28, the outer end of which is provided with a float 29 which maintains the valve 27 seated until the level of the lubricant in the chamber 13y' is lowered, whereupon the pressure in the reservoir 13y will force lubricant therefrom through the pipe 13z' to the chamber 13y' until the rise of the float 29 re-seats the valve 27.

15x indicates a pipe leading from the casing 1x and arranged to supply a portion of the liquid therein to the lantern ring 8x to equalize the pressure of the lubricant supplied to the pressure ring 9x and prevent intake of air into the casing 1x, as already set forth. 16x indicates a tank, the bottom of which is connected to the pipe 15x by a pipe 16x', whereby a portion of the liquid supplied to the pipe 15x flows into the tank 16x and compresses the air therein to apply pressure on the lubricant in the chamber 13y' through a pipe 16x'' connecting the upper wall of the tank 16x with the chamber 13y'.

30 indicates as an entirety hydro-pneumatic means for automatically supplying air pressure in the reservoir 13y'' above the lubricant therein, to insure flow therefrom to the chamber 13y'. The pressure supply means 30 consists of the following: 31 indicates a tank connected at its upper end by a pipe 31a to the upper end of the reservoir 13y''. 32 indicates a pipe leading from the casing 1x to an intake valve 33 mounted in the bottom wall of the tank 31, the valve element of the valve consisting of a plunger 33a which is raised and lowered as later set forth. 34 indicates a main discharge opening or outlet provided in the bottom wall of the tank 31 and controlled by a rod 35 which is slidably mounted in a tube 35a suitably supported on the bottom wall of the tank 31. The lower end of the tube 35a is formed with one or more ports which communicate with the opening 34 and the latter is connected to a pipe 36 which leads into the casing 1x to discharge the liquid thereinto. 37 indicates a secondary discharge opening or outlet provided in the bottom wall of the tank and connected to a pipe 37a which in turn is preferably connected to the pipe 36 to discharge the liquid from the tank 31 into the casing 1x. The pipe 37a is provided with a valve 37b which is adjusted to regulate the emptying of the tank 31 as later set forth. The pipe 37a is preferably formed of transparent material whereby the quantity of liquid escaping through the valve 37b may be observed. 38 indicates a float which, in connection with the valve 37b, controls the operation of the valve element 33a and rod 35. The walls of the float are shaped to provide a central opening 38a therethrough for the rod 35 and tube 35a, whereby the float is guided during rise and fall of the liquid in the tank 31. The lower end of the opening 38a is preferably provided with a collar 38a' to reinforce the float walls. 39 indicates a rocker fulcrumed on a standard 39a which is provided on the bottom wall of the tank 31 between the valve 33 and outlet 34. The outer end of the rocker extends through a slot 33a' formed in the plunger 33a and engages the bottom end wall of the slot to operate the plunger 33a downwardly (when rocked clockwise as viewed in Fig. 4) to close the intake valve 33 and relate the upper end wall of the slot to the outer end of a separate rocker 40, which is also fulcrumed on the standard 39a about the rocker 39. The inner end of the rocker 39 extends through a slot 35b formed in the rod 35 (the tube 35a being formed with openings to accommodate the rocker), the upper end of the slot 35b serving to engage the rocker 39 and rock it counterclockwise (as viewed in Fig. 4) when the rod 35 is moved downwardly to close the outlet 34 and the lower end of the slot 35b serving to engage the rocker 39 and rock it clockwise to move the plunger 33a downwardly to close the inlet valve 33. The outer end of the rocker 40 extends through the slot 33a' formed in the plunger 33a and operates, when rocked counter-clockwise as viewed in Fig. 4, to engage the upper end wall of the slot 33a' and raise the plunger 33a to open the valve 33. The inner end of the rocker 40 is bifurcated to straddle the tube 35a so as to be in the path of movement of the float 38 when the latter gravitates downwardly. 41 indicates a trip pivoted in the side walls of an elongated slot 41a formed in the rod 35 above the slot 35b. The outer end of the trip 41 is provided with inner and outer wings. The inner wing is arranged to engage a cam 42 on the wall of the tube 35a, the cam serving to swing the trip 41 outwardly, when the rod 35 is raised, to position the outer wing of the trip in the path of movement of the float 38.

Fig. 4 shows the position of the float 38, plunger 33a and rod 35 following the filling of the tank 31 with liquid from the casing 1x through pipe 32; the filling of the tank 31 with liquid serving to compress the air therein to effect air pressure in the reservoir 13y'' and by engagement of the float 38 with a head 35' on the upper end of the rod 35, the latter has been moved upwardly to open the opening 34, so that discharge of the liquid in the tank 31 automatically starts. As the liquid level in the tank 31 drops the float gravitates and first engages the outer wing on the trip 41 and operates therethrough to move the rod downwardly to close the opening 34. Due to the fact that the valve 37b is adjusted to permit a slow flow of the liquid from the tank 31, the liquid level in the tank 31 continues to drop, following the closing of the opening 34, whereby the float continues to gravitate (the cam 42 permitting the trip 41 to swing inwardly within the tube 35a) and finally the bifurcated end of the rocker 40 to rock it, the operation of which (counter-clockwise as viewed in Fig. 4) swings its outer end upwardly and moves the plunger 33a into open position, whereby liquid is supplied to the tank 31 to raise the float 38 which through its engagement with the head 35' raises the rod 35. The raising of the rod 35 opens the opening 34, effects engagement of the lower end wall of the slot 35b with the rocker 39 which closes the valve 33 and re-positions the trip 41 for engagement by the float 38 in its succeeding gravitational movement. From the foregoing description it will be seen that the tank 31 is alternately filled and emptied automatically under control of the float 38 and that when the air pressure is built up in the reservoir 13y'', due to rise of the liquid in the tank 31, the lubricant in the reservoir 13y'' will be forced into the supply chamber 13y' provided the supply therein has been lowered sufficiently to permit the float 29 to open the valve 27.

The collector 19x also serves as a receiver for lubricant which may be added to the system from time to time.

Fig. 5 illustrates a different modification of the invention. In this view, 50 indicates a casing which encloses a mechanism (not shown) the operation of which creates a pressure therein. 51 is a boss through which a shaft 52 extends for driving connection with the mechanism. 53 indicates as an entirety a packing within the boss 51 for the shaft. The packing 53 consists of a section of packing material 54 seated against the inner wall 51a of the boss, a lantern ring 55 in engagement with the packing material 54, an inner pressure ring 56, an outer pressure ring 56a, an intermediate pressure ring 56b, a section of packing material 57 between the lantern ring 55 and inner pressure ring 56, a section of packing material 58 between each pressure ring and the intermediate pressure ring 56b and a section of packing material 59 between the outer pressure ring 56a and a clamping device 60, which is adjustably connected to the outer end wall of the boss 51 similarly to the device 6 shown in Fig. 1, the device 60 serving to hold the parts of the packing together. The construction of the pressure rings and packing materials therebetween form the subject-matter of my co-pending application Serial No. 557,921, filed October 9, 1944, now Patent No. 2,444,874, for which reason no claim is made thereto in this application. By preference the lantern ring 55 is formed of two sections which are held together by a connector 55a.

61 indicates a reservoir for the lubricant disposed below the discharge end of a return pipe 62. The upper end of the pipe 62 is connected to a collector 63. 63a indicates a pipe connected at its lower end to a duct 63b formed in the wall of the boss 51 and leading from the outlet formed in the outer pressure ring 56a, whereby the lubricant flowing to the outer pressure ring 56a may rise into the collector and then gravitate to the reservoir 61. The upper end of the pipe 63a extends into the collector 63 and terminates in a downwardly extending nozzle 63c. As the walls of the collector are formed of transparent material, the flow of lubricant from the nozzle 63c may be observed. A screen 64 is provided in the upper end of the reservoir 61 to filter the lubricant discharged from the pipe 62.

65 indicates a well disposed adjacent to the reservoir. The lower end of the wall between the reservoir 61 and well 65 is formed with an opening 65a through which the liquid in the reservoir 61 flows into the well 65. The purpose of the well will later be apparent. 66 indicates a supply chamber for the lubricant, the lower end of the chamber being connected by a pipe 67 to the recess 56' formed in the inner pressure ring 56.

68 indicates a pipe leading from the casing 50 to the lantern ring 55 for supplying liquid thereto to counter-balance the pressure of the lubricant supplied to the packing 53, as well as to form a seal to prevent intake of air into the casing 50. The pipe 68 is provided with a valve 68a which permits the liquid supply to be cut off. 69 indicates a pipe connected to the liquid supply pipe 68 intermediate the casing 50 and valve 68a and connected to the bottom wall of a tank 70, the upper end of the tank being connected to the upper end of the lubricant supply chamber 66 by a pipe 70a. In this arrangement, the liquid supplied to the tank 70 will compress the air therein and hence maintain a pressure on the lubricant in the supply chamber 66, the effect of which is to supply lubricant from the chamber 66 through the pipe 67 to the inner pressure ring 56 under pressure. 71 indicates lubricant supply connections leading from the lower end of the well 65 to the lower end of the supply chamber 66. The outer or discharge end of the connections 71 is provided with a seat for a valve 71a which is supported on a pivoted arm 71b carrying a float 72 which maintains the supply connections 71 closed so long as the lubricant in the chamber 66 is above a predetermined level. 73 indicates a spring operated check valve in the connections 71 to prevent flow of the lubricant from the chamber 66 to the well 65. Intermediate the well 65 and the check valve 73 the connections 71 are provided with a motor driven pump 74 (preferably of the rotary type). The motor for the pump is supplied with current from a suitable source, the circuit for the motor being provided with a suitable switch 74a. The operation of the switch 74a to close and open the circuit for the pump motor is controlled by the rise and fall of the liquid level in the well 65, for which purpose I provide in the well a float 75 guided by a rod 75' having spaced limiting stops for engagement by the float. The upper end of the rod 75' is pivotally connected to the arm of the switch 74a, so that when the float 75 rises, due to rise of the liquid level in the well 65, it engages the upper limiting stop, and operates through the rod 75' to close the switch 74a and when the liquid level drops to the level of the lower limiting stop on the rod 75' the engagement of the float 75 therewith operates through the rod 75' to open the switch 74a, whereby the pump 74 forces the lubricant from the well 65 to the chamber 66, provided the valve 71a is unseated. The pump 74 is provided with a by-pass (not shown as such by-pass is a conventional expedient) for discharge of the lubricant into the well 65 in the event the valve 71a is closed.

In the form of construction shown in Fig. 1 the pressure generated in the casing 1 is applied simultaneously to the lantern ring 3 and supply chamber 13', so that so long as the mechanism in the casing 1 is running, the check valve 13x' prevents escape or flow of air or lubricant from the chamber 13' to the chamber 13''; but upon the stoppage of the mechanism, the pressure in the chamber 13' is reduced to atmospheric pressure, whereupon the lubricant in the reservoir will gravitate through the pipe 13x to the chamber. The walls of the tank 13 may be formed of transparent material, whereby the level of the lubricant in the chamber 13' and/or chamber 13'' can be observed to determine whether additional lubricant should be supplied to the reservoir by filling of the cup 21 and discharging it therefrom through the valve 22. In the forms of construction shown in Figs. 3 and 5, means are provided for forcing the lubricant from the reservoir to the supply chamber, while the mechanism is running, the supply means being automatically controlled by the rise and fall of the lubricant level in the supply chamber.

From the foregoing description it will be observed that the lubricant is supplied to the packing under pressure, flows through the packing and is circulated for re-supply to the packing and that the packing is constructed to provide pressure between the inner end of the packing and the inlet for the lubricant, so that leakage of lubricant into the casing is prevented. The pressure on the packing material of the packing is adjusted to insure lubrication of the shaft and flow of the lubricant from the inlet therefor to the outer pressure ring. In the forms of packing shown in Figs. 3 and 5, the sections of packing material and faces of the pressure rings are disposed at an oblique angle to the axis of the shaft, whereby a portion of the packing material overlaps a diametrical portion of the inner pressure ring, so that the lubricant supplied through the inner pressure ring to the shaft is carried by the latter into engagement with the packing material. As the supply of lubricant is continuous it is forced along the shaft to the outer pressure ring, from which the lubricant flows to the collector and then from the collector to the reservoir.

To those skilled in the art to which my invention relates many changes in construction and widely differing embodiments and applications of the invention will suggest themselves without departing from the spirit and scope thereof. My disclosures and the description herein are purely illustrative and not intended to be in any sense limiting.

What I claim is:

1. In an apparatus of the class described, the combination with a liquid receiving casing for a mechanism the operation of which creates a pressure on the liquid therein, a boss provided on the casing and a shaft extending through the boss, of a packing in the boss surrounding said shaft, consisting of an inner pressure ring, an outer pressure ring and packing material between said rings, a supply chamber for lubricant connected to said inner pressure ring, hydropneumatic means connected to said casing and said chamber and dependent on the pressure in said casing for forcing lubricant from said chamber to said inner pressure ring, and means between said inner pressure ring and the inner end wall of said boss and connected to said casing for establishing a pressure counter to the pressure of the lubricant supplied by said hydropneumatic means.

2. An apparatus as claimed in claim 1 wherein said counter pressure means consist of a lantern ring connected with said casing and packing material between said lantern ring and said inner pressure ring and between said lantern ring and the inner end wall of said boss.

3. In an apparatus of the class described, the combination with a liquid receiving casing for a mechanism the operation of which creates a pressure on the liquid therein, a boss provided on the casing and a shaft rotatable in and extending through the boss, of a packing in the boss surrounding such shaft, consisting of a lantern ring, a packing element outwardly of said ring, and packing material outwardly of said packing element, a supply chamber for lubricant connected with one end of said packing material, means connected with said casing for simultaneously supplying fluid medium under pressure to said lantern ring and said supply chamber, and a discharge conduit for the lubricant leading from the opposite end of said packing material.

4. In an apparatus of the class described, the combination with a liquid receiving casing for a mechanism the operation of which creates a pressure on the liquid therein, a boss provided on the casing and a shaft rotatable in and extending through the boss, of a packing in the boss for said shaft, consisting of an inner pressure ring, an outer pressure ring and packing material between said rings, a main chamber for lubricant, hydro-pneumatic means connected with said casing and actuated by the pressure created therein for supplying the lubricant in said chamber to said inner pressure ring under pressure, a separate chamber, connections between said outer pressure ring and said separate chamber, and means controlled by the level of the liquid in one of said chambers for supplying lubricant from said separate chamber to said main chamber.

5. In an apparatus of the class described, the combination with a liquid receiving casing for a mechanism the operation of which creates a pressure on the liquid therein, a boss provided on the casing and a shaft extending through the boss, of a packing in the boss for said shaft, consisting of a lantern ring, an inner pressure ring, an outer pressure ring, and packing material between said rings, a lubricant supply chamber connected to said inner pressure ring, a tank, a pipe leading from the upper end of said tank to said lubricant supply chamber, liquid connections between said casing and said lantern ring and the lower end of said tank for supplying liquid under pressure thereto, the liquid supplied to said tank serving to compress the air therein to apply pressure on the lubricant in said chamber.

6. An apparatus as claimed in claim 5 wherein is provided means for re-supplying the lubricant flowing through said packing material to said outer pressure ring to said chamber.

7. In an apparatus of the class described, the combination with a liquid receiving casing for a mechanism the operation of which creates a pressure on the liquid therein, a boss provided on the casing and a shaft rotatable in and extending through the boss, of a packing in the boss for said shaft, consisting of an inner pressure ring, an outer pressure ring and packing material between said rings, a chamber for lubricant, means for supplying the lubricant in said chamber to said inner pressure ring under pressure, a reservoir, connections between said outer pressure ring and said reservoir, connections between said reservoir and said chamber, and hydro-pneumatic means for supplying pressure to said reservoir to transfer lubricant therein through said connections to said chamber.

8. An apparatus as claimed in claim 7 wherein is provided in said chamber a float operated valve for controlling the flow of the lubricant from said reservoir to said chamber.

9. An apparatus as claimed in claim 7 wherein said hydro-pneumatic means consists of a tank having an outlet at its lower end, a pipe leading from the upper end of said tank to said reservoir, liquid connections between said casing and the lower end of said tank, a valve for said liquid connections and a float in said tank dependent on the rise and fall of the liquid level therein for controlling said valve, the rise of the liquid in said tank serving to compress the air therein to apply pressure to the lubricant in said reservoir.

10. In an apparatus of the class described, the combination with a liquid casing for a mechanism the operation of which creates a pressure on the liquid therein, a boss provided on the casing and a shaft extending through the boss, of a packing in the boss surrounding said shaft, a lantern ring, an inner pressure ring, an outer pressure ring, packing material between said lantern ring and the inner end wall of said boss and packing material between said rings, a lubricant supply chamber connected to said inner pressure ring, and means for utilizing the pressure in said casing for supplying the lubricant from said chamber to said inner pressure ring and maintaining a pressure in said lantern ring substantially equal to the pressure applied to said lubricant in said chamber.

11. In an apparatus of the class described, the combination with a liquid receiving casing for a mechanism the operation of which creates a pressure on the liquid therein, a boss provided on the casing and a shaft rotatable in and extending through said boss, of a packing in said boss for said shaft, consisting of an inner pressure ring, an outer pressure ring and packing material between said rings, a main chamber for lubricant, means between said casing and said chamber for utilizing the pressure in said casing for forcing the lubricant from said chamber to said inner pressure ring and through said packing to said outer pressure ring, a separate chamber, connections between said outer pressure ring and said separate chamber, connections between said chambers, said connections including a pump, and means controlled by the level of the liquid in said separate chamber for operating said pump.

12. Apparatus as claimed in claim 11 wherein said connections between said chambers are provided with a valve arranged to be operated by a float in said main chamber due to rise and fall of the level of the lubricant therein to control the flow of liquid through said connections into said main chamber.

13. In apparatus of the class described, the combination with a liquid receiving casing for a mechanism the operation of which creates a pressure on the liquid therein, a boss provided on the casing and a shaft rotatable in and extending through said boss, of a packing in the boss for said shaft, consisting of an inner pressure ring, an outer pressure ring and packing between said rings, a chamber for lubricant, connections between said chamber and said inner pressure ring, a reservoir, connections between said outer pressure ring and said reservoir, connections between said reservoir and said chamber, hydro-pneumatic means connected with said casing and said chamber and dependent on the pressure in said casing for forcing the lubricant in said chamber into said inner pressure ring for flow through said packing to said reservoir, and automatically operated means for controlling the flow of lubricant from said reservoir to said chamber.

14. Apparatus as claimed in claim 13 wherein the connections between said reservoir and said chamber are provided with a discharge valve, the operation of which is controlled by a float in said chamber.

15. In an apparatus of the class described, the combination with a liquid receiving casing for a mechanism the operation of which creates a pressure on the liquid therein, a boss provided on the casing and a shaft rotatable in and extending through said boss, of a packing in the boss for said shaft, consisting of an inner pressure ring, an outer pressure ring and packing material between said rings, a chamber for lubricant, hydro-pneumatic means connected with said casing and actuated by the pressure created therein for supplying the lubricant in said chamber to said inner pressure ring under pressure, a separate chamber for lubricant, connections between said outer pressure ring and said separate chamber, a passage for lubricant from said separate chamber to said first mentioned chamber, and means dependent on the decrease of pressure in said first mentioned chamber to a pressure below that in said separate chamber to provide for flow of lubricant from said separate chamber to said first mentioned chamber.

16. In an apparatus of the class described, the combination with a liquid receiving casing for a mechanism the operation of which creates a pressure on the liquid therein, a boss provided on the casing and a shaft rotatable in and extending through said boss, of a packing in the boss for said shaft, consisting of an inner pressure ring, an outer pressure ring and packing material between said rings, a chamber for lubricant, hydro-pneumatic means connected with said casing and said chamber to set up a pressure on the lubricant in the latter during operation of the mechanism to effect discharge of the lubricant to said inner pressure ring under pressure, a separate chamber for lubricant, connections between said outer pressure ring and said separate chamber, a passage for lubricant from said separate chamber to said first mentioned chamber, a check valve in said passage arranged to be operated to open position by the hydro-static head of the liquid in said separate chamber upon relief of pressure in said first mentioned chamber, whereby liquid in said separate chamber is supplied to said first mentioned chamber.

EDWARD HANSON.

REFERENCES CITED

The following references are of record in the file of this patent:

UNITED STATES PATENTS

| Number | Name | Date |
| --- | --- | --- |
| 657,343 | Fisher | Sept. 4, 1900 |
| 2,143,637 | Vollman | Jan. 10, 1939 |
| 2,332,150 | Huff | Oct. 19, 1943 |

FOREIGN PATENTS

| Number | Country | Date |
| --- | --- | --- |
| 23,817 | Great Britain | 1912 |